(12) United States Patent
Huinck

(10) Patent No.: US 6,936,096 B2
(45) Date of Patent: Aug. 30, 2005

(54) HOLT MELT INK COMPRISING A MIXTURE OF DYES

(75) Inventor: Marcus P. L. Huinck, Herten (NL)

(73) Assignee: Oce-Technologies B.V., Venlo (NL)

( * ) Notice: Subject to any disclaimer, the term of this patent is extended or adjusted under 35 U.S.C. 154(b) by 0 days.

(21) Appl. No.: 10/827,290

(22) Filed: Apr. 20, 2004

(65) Prior Publication Data

US 2005/0005819 A1 Jan. 13, 2005

(30) Foreign Application Priority Data

May 7, 2003 (NL) ............................................. 1023355

(51) Int. Cl.[7] .......................... C09D 11/00; C09D 11/12
(52) U.S. Cl. .................. 106/31.29; 106/31.32
(58) Field of Search ............................ 106/31.29, 31.32

(56) References Cited

U.S. PATENT DOCUMENTS 5,507,864 A    4/1996   Jaeger et al.
6,015,847 A  * 1/2000   Titterington et al. ........ 523/160

FOREIGN PATENT DOCUMENTS

EP    0 936 258 A1    8/1999
WO    WO 01/30919 A1   5/2001

* cited by examiner

Primary Examiner—J. A. Lorengo
Assistant Examiner—Veronica F. Faison
(74) Attorney, Agent, or Firm—Birch, Stewart, Kolasch & Birch, LLP

(57) ABSTRACT

The invention relates to an ink composition which is solid at room temperature and liquid at a higher temperature, comprising a non-aqueous carrier composition and two compatible dyes, one of which is fluorescent and one non-fluorescent, wherein the said dyes are of the same type. In one embodiment, the dyes in the ink are both of the anthraquinone type.

3 Claims, No Drawings

HOLT MELT INK COMPRISING A MIXTURE OF DYES

This Nonprovisional application claims priority under 35 U.S.C. § 119(a) on Patent Application No(s). 1023355 filed in The Netherlands on May 7, 2003, the entire contents of which are hereby incorporated by reference.

The invention relates to an ink composition which is solid at room temperature and liquid at a higher temperture, comprising a non-aqueous carrier composition and two compatible dyes, one of which is a fluorescent dye and one non-fluorescent.

An ink composition of this kind, which is also known as a hot melt ink, is known from U.S. Pat. No. 5,507,864. This patent describes a hot melt ink containing as carrier a composition based on a fatty acid amide compound, particularly a tetra-amide compound. To obtain an ink which has sufficient color saturation, a combination of a fluorescent dye and a non-fluorescent dye is used, the two dyes being of a different type. From the Color Index (C.I.) it is a simple matter to determine whether dyes are of a different type. As an example, an ink is described which contains a combination of the C.I. Solvent Red 172 (non-fluorescent dye of the anthraquinone type) and C.I. Solvent Red 49 (a fluorescent rhodamine dye of the xanthene type). The use of dyes of different chemical types offers the possibility of still being able to dissolve a relatively large quantity of another dye when the carrier composition is saturated with one dye. In this way it is possible to obtain a hot melt ink which has a deep powerful color.

A disadvantage of the known hot melt ink is that the color impression of a printed full-color image for which this ink is used is subject to change even if the receiving material with the ink disposed thereon is kept in the dark. This practically precludes any attack of the dyes by UV radiation, which is a known cause of color change in dyes.

The object of the invention is to provide a hot melt ink which obviates the above-described disadvantage. To this end, an ink composition according to the preamble has been invented which is characterized in that the dyes are of the same type. It has surprisingly been found that an ink of this kind has better resistance to color change. The reason for this is not completely clear but may be connected with the fact that dyes of the same type have a less marked tendency to separate from the carrier composition. Separation, for example the formation of clusters of dye molecules which may or may not be crystallized, in the solidified ink composition, may produce a considerable color change, particularly a loss of color strength (Chroma). The fact that separation may be a possible cause can be interpreted as follows. A hot melt ink is often a complex composition of carrier materials (often a mixture of amorphous and crystalline materials), viscosity controllers, anti-oxidants and dyes. It is difficult to prepare an ink such that all the components of the said ink are compatible with one another under all circumstances. For example, during printing, a hot melt ink is typically heated to a temperature of 140° C. After printing, the ink cools to a temperature of 20° C. Also, before it is actually printed, an ink is often exposed to various heating and cooling cycles in a print head. The risk of separation of the components applies as a result. Since the dyes in the ink according to the invention have the same chemical origin, i.e. are derived from the same basic molecule, they automatically adapt to one another and separation of one of the two dyes from the carrier composition of the ink will be much less probable. In addition, this solution offers the advantage that it is easier to find an optimal carrier composition, because it only has to dissolve dyes of the same type.

In one embodiment, the dyes are of the anthraquinone type. It has been found that this is a better way of counteracting the disadvantage that the known inks have. Inks according to this embodiment are particularly color-fast when compared with the known inks in the case of storage in the dark. The reason for this does not consist in the fact that anthraquinone dyes are resistant to UV radiation. This property is not relevant on storage in the dark. Apparently dyes of this type, which includes, for example, the dyes C.I. Solvent Red 145 to 151, and the dyes as described in Kirk-Othmer Encyclopedia of Chemical Technology, $4^{th}$ Edition, Volume 8, pages 1 to 57, are compatible with one another to such an extent that it is possible to obtain inks with a very good color stability.

In a further embodiment the fluorescent dye is C.I. Solvent Red 149 and the non-fluorescent dye is C.I. Solvent Red 172. It has been found that an ink which has a dye composition according to this embodiment has a very fresh magenta color, of sufficient strength and clarity and also that the color is very stable.

The invention will now be explained with reference to the following examples.

Example 1 is an ink composition according to the invention.

Example 2 is another ink composition according to the invention.

Example 3 shows how a binder for use in a carrier composition can be made.

EXAMPLE 1

A hot melt ink according to the invention is based on a carrier composition containing 65% by weight of the bis-ester formed from the reaction of 1,4-dimethanol trans-cyclohexane and 2 mol-equivalents of orthomethylbenzoic acid. This compound, also known as Cyclo-2T, is disclosed in EP 1 067 157 (Table 2, under D, compound 17). In addition, the carrier composition contains 35% by weight of an amorphous component which is a mixture of different compounds. Example 3 indicates how this amorphous component can be obtained. The dyes added per 100 g of carrier composition are 1.125 g CI Solvent Red 172 and 1.125 g CI Solvent Red 149. CI Solvent Red 172 is available from Messrs Buckeye under the tradename LambdaPlast Red L2B. This dye is also known as Morplus Magenta 36 and Xindasol Red 172. CI Solvent Red 149 is also available from Messrs Buckeye under the tradename LambdaPlast FL Red FGA. This dye is also known under the name Sumiplast Red HFG and Xindasol Red 149.

The ink obtained in this way appears to have a sparkling magenta color that undergoes practically no color change when transferred to a plain paper receiving material and stored in the dark.

EXAMPLE 2

The ink according to this example is practically identical to the ink according to Example 1. The difference is that instead of the dye CI Solvent Red 149, the dye CI Solvent Red 150 is used. This dye is available from Messrs Arimoto Chemical Corporation Ltd under the name Plast Red 8365. This dye is also known under the name Sumiplast Red HF 4G.

A sparkling magenta color can also be obtained with this fluorescent dye of the anthraquinone type and is subject to practically no color change when transferred to a plain paper receiving material and stored in the dark.

It should be clear that the inks according to Examples 1 and 2 are only embodiments of the present invention and also that inks for use in practice may contain not only dyes and a carrier composition but all kinds of additives such as anti-oxidants, viscosity controllers, biocides, pigments, and so on.

EXAMPLE 3

This Example describes the method used for making a reaction product of di-isopropanolamine, benzoic acid and succinic acid anhydride. A one-liter reaction flask was provided with a mechanical agitator, a thermometer and a DeanStark arrangement. 261.06 g (1.960 mol) of di-isopropanol amine (type S, BASF), 540.88 g (4.429 mol) of benzoic acid (Aldrich) and 69.69 g (0.696 mol) of succinic acid anhydride (Aldrich) were placed in the flask. A small quantity of o-xylene, approximately 60 ml, was added as entraining agent in order to remove the liberated water. The reaction mixture was kept in a nitrogen atmosphere and heated for 1 hour at 165° C., whereafter the reaction temperature was brought to 180° C. After 6 hours the temperature was reduced to 160° C. and the flask was evacuated to remove the o-xylene. After about 1 hour it was possible to tap off the reaction mixture. Analysis showed that the number-averaged molecular weight ($M_n$) was 583 and the weight-average molecular weight ($M_w$) was 733. The ratio between $M_w$ and $M_n$ (1.26) is indicative of the fact that a mixture of compounds has formed. In formula 1 below, the compounds that can form during the reaction between di-isopropanol amine, benzoic acid and succinic acid are diagrammatically indicated (it should be noted that formula 1 is the most probable structure of the resulting compounds). The reaction shows the formation of a mono-disperse compound. The ratio of the reactants as shown in the formula is associated with a selected value for n. This ratio need not be equal to the ratio for the overall reaction, which is, in fact, a mixture of compounds with different values for n forms. In the reaction according to this example, a ratio has been selected equal to 2.82:6.36:1 (di-isopropanol amine: benzoic acid: succinic acid anhydride). This means that there are 3×2.82=8.46 mol-equivalents of reactive NH/OH groups in the amine, against 6.36+2×1.00=8.36 mol/equivalents acid groups in the benzoic acid and anhydride. There is therefore a very small excess (about 1%) of di-isopropanol amine.

A GPC analysis showed that the mixture contained approximately 45% by weight of the compound with n=0, approximately 40% by weight of the compound with n=1 and approximately 15% by weight of compounds with n=2 or above. This corresponds approximately to 60 mol-percent of the compound with n=0; 30 mol-percent of the compound with n=1 and 10 mol-percent of compounds with n=2 or higher.

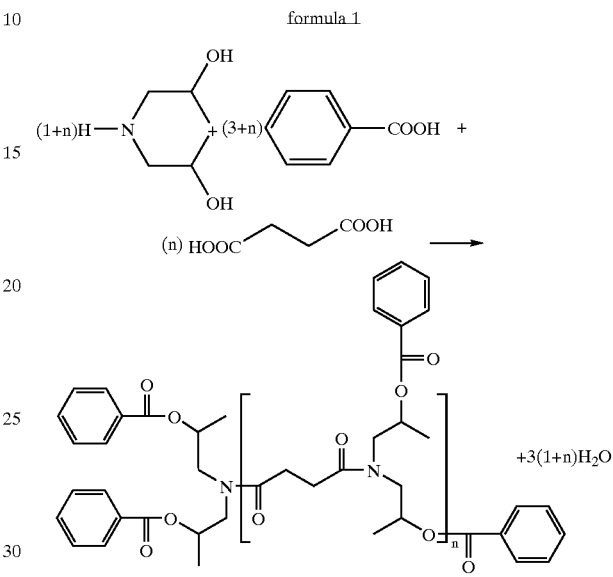

What is claimed is:

1. An ink composition which is solid at room temperature and liquid at a higher temperature, comprising a non-aqueous carrier composition and two compatible dyes, one of which is fluorescent and one non-fluorescent, wherein the said dyes are of the same type.

2. An ink composition according to claim 1, wherein the dyes are of the anthraquinone type.

3. An ink composition according to claim 2, wherein the fluorescent dye is CI Solvent Red 149 and the non-fluorescent dye is CI Solvent Red 172.

* * * * *